United States Patent
Benedek et al.

(10) Patent No.: US 8,812,556 B2
(45) Date of Patent: Aug. 19, 2014

(54) STORING MODIFICATION DATA FOR RECREATING MODIFICATIONS

(75) Inventors: Laszlo C. Benedek, Richmond Hill (CA); Hesham E. Fahmy, Etobicoke (CA); John H. Green, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 1458 days.

(21) Appl. No.: 11/398,875

(22) Filed: Apr. 6, 2006

(65) Prior Publication Data

US 2007/0236746 A1    Oct. 11, 2007

(51) Int. Cl.
*G06F 7/00*  (2006.01)
*G06F 17/30* (2006.01)

(52) U.S. Cl.
USPC ........................................... 707/802

(58) Field of Classification Search
USPC ......... 709/201; 705/31; 707/10, 802, 999.102
See application file for complete search history.

(56) References Cited

U.S. PATENT DOCUMENTS

| | | |
|---|---|---|
| 5,228,123 A | 7/1993 | Heckel |
| 5,467,472 A | 11/1995 | Williams et al. |
| 5,507,030 A | 4/1996 | Sites |
| 5,625,823 A | 4/1997 | Debenedictis et al. |
| 5,642,511 A | 6/1997 | Chow et al. |
| 5,642,513 A | 6/1997 | Schnellinger et al. |
| 5,786,815 A | 7/1998 | Ford |
| 5,822,520 A | 10/1998 | Parker |
| 5,825,877 A | 10/1998 | Dan et al. |
| 5,870,088 A | 2/1999 | Washington et al. |
| 5,872,974 A | 2/1999 | Mezick |
| 5,897,642 A | 4/1999 | Capossela et al. |
| 5,929,851 A | 7/1999 | Donnelly |
| 5,950,001 A | 9/1999 | Hamilton et al. |
| 5,991,534 A | 11/1999 | Hamilton et al. |
| 6,006,242 A | 12/1999 | Poole et al. |
| 6,044,217 A | 3/2000 | Brealey et al. |
| 6,049,805 A | 4/2000 | Drucker et al. |
| 6,059,838 A | 5/2000 | Fraley et al. |
| 6,100,885 A | 8/2000 | Donnelly et al. |
| 6,208,336 B1 | 3/2001 | Carter |

(Continued)

FOREIGN PATENT DOCUMENTS

WO    9960478    11/1999

OTHER PUBLICATIONS

U.S. Appl. No. 11/399,232, Notice of Allowance and Fees Due, Dec. 28, 2009, 7 pages.

(Continued)

*Primary Examiner* — Alexey Shmatov
(74) *Attorney, Agent, or Firm* — Ryan Lewis; Hoffman Warnick LLC

(57) ABSTRACT

A solution for managing a set of artifacts is provided in which modification data is captured while an artifact is modified and is stored. A proxy agent is generated for a framework agent that manages a set of modifications for an artifact. The proxy agent receives a modification message from, for example, a graphical user interface, captures modification data based on the modification message and forwards the modification message for processing by the framework agent. The captured modification data is serialized in an extensible markup language (XML)-based document for later processing. In one embodiment, the XML-based document comprises an Ant configuration file (script), which can be executed to recreate the modification(s) with or without generating a user interface.

20 Claims, 3 Drawing Sheets

(56) References Cited

U.S. PATENT DOCUMENTS

| | | | |
|---|---|---|---|
| 6,237,135 B1 | 5/2001 | Timbol | |
| 6,286,134 B1 | 9/2001 | Click, Jr. et al. | |
| 6,523,170 B1 | 2/2003 | Cuomo et al. | |
| 6,609,123 B1 | 8/2003 | Cazemier et al. | |
| 6,609,128 B1 | 8/2003 | Underwood | |
| 6,629,002 B1* | 9/2003 | Holder | 700/96 |
| 6,697,967 B1* | 2/2004 | Robertson | 714/43 |
| 6,721,777 B1 | 4/2004 | Sharma | |
| 6,784,883 B1 | 8/2004 | Allor | |
| 6,807,632 B1 | 10/2004 | Carpentier et al. | |
| 6,816,882 B1 | 11/2004 | Conner et al. | |
| 6,928,640 B2 | 8/2005 | Schlussman | |
| 6,941,515 B1 | 9/2005 | Wilkins | |
| 6,961,932 B2 | 11/2005 | Mishra et al. | |
| 7,003,560 B1 | 2/2006 | Mullen et al. | |
| 7,127,641 B1* | 10/2006 | Anderson | 714/38 |
| 7,152,090 B2 | 12/2006 | Amirisetty et al. | |
| 7,216,299 B2 | 5/2007 | Knight | |
| 7,278,136 B2 | 10/2007 | Moritz et al. | |
| 7,376,939 B1 | 5/2008 | Nayak et al. | |
| 7,421,686 B2 | 9/2008 | Souloglou et al. | |
| 7,434,211 B2 | 10/2008 | Wynn et al. | |
| 7,454,492 B2 | 11/2008 | Bauer et al. | |
| 7,467,375 B2 | 12/2008 | Tondreau et al. | |
| 7,519,956 B2 | 4/2009 | Fukuda et al. | |
| 7,533,246 B2 | 5/2009 | Taylor | |
| 7,581,212 B2 | 8/2009 | West et al. | |
| 2002/0035488 A1* | 3/2002 | Aquila et al. | 705/4 |
| 2002/0184401 A1 | 12/2002 | Kadel, Jr. et al. | |
| 2003/0069969 A1 | 4/2003 | Renaud | |
| 2003/0084425 A1 | 5/2003 | Glaser | |
| 2003/0112275 A1 | 6/2003 | Proulx et al. | |
| 2004/0078495 A1 | 4/2004 | Mousseau et al. | |
| 2004/0133627 A1* | 7/2004 | Kalyanaraman et al. | 709/201 |
| 2004/0162724 A1 | 8/2004 | Hill et al. | |
| 2004/0215655 A1 | 10/2004 | Rangadass | |
| 2005/0044110 A1 | 2/2005 | Herzenberg et al. | |
| 2005/0114834 A1 | 5/2005 | Richards, Jr. et al. | |
| 2005/0138646 A1 | 6/2005 | Mese et al. | |
| 2006/0195777 A1* | 8/2006 | Davis et al. | 715/500 |
| 2006/0236254 A1 | 10/2006 | Mateescu et al. | |
| 2007/0038610 A1 | 2/2007 | Omoigui | |
| 2007/0050366 A1 | 3/2007 | Bugir et al. | |
| 2007/0050419 A1 | 3/2007 | Weyl et al. | |
| 2007/0150387 A1* | 6/2007 | Seubert et al. | 705/31 |

OTHER PUBLICATIONS

U.S. Appl. No. 11/399,232, Office Action, Jul. 23, 2009, 15 pages.
Psaila, "Virtual DOM: an Efficient Virtual Memory Representation for Large XML Documents", 19th International Conference on Database and Expert Systems Application, 2008, IEEE, pp. 233-237.
Al-Ekram et al., "An XML-based Framework for Language Neutral Program Representation and Generic Analysis", Proceedings of the 28th Annual International Computer Software and Applications Conference (COMPSAC '04), 2004 IEEE, 2 pgs.
Van Engelen, "Code Generation Techniques for Developing Light-Weight XML Web Services for Embedded Devices", 2004 ACM Symposium on Applied Computing, Mar. 14-17, 2004, pp. 854-861.
Corwin et al., "MJ: A Rational Module System for Java and its Applications", OOPSLA '03, Oct. 26-30, 2003, pp. 241-254.
Hentrich et al., "Patterns for Business Object Model Integration in Process-Driven and Service-Oriented Architectures", PLoP '06, Oct. 21-23, 2006, 14 pgs.
U.S. Appl. No. 10/907,363, Office Action, Jun. 1, 2007, 21 pages.
U.S. Appl. No. 10/907,363, Office Action, Oct. 30, 2007, 25 pages.
U.S. Appl. No. 10/907,363, Office Action, Apr. 7, 2008 19 pages.
U.S. Appl. No. 10/907,363, Office Action, Sep. 30, 2008, 17 pages.
U.S. Appl. No. 10/907,363, Office Action, Mar. 3, 2009 16 pages.
U.S. Appl. No. 10/907,363, Examiner's Answer, Feb. 28, 2011, 12 pages.
Bernstein et al., "The Microsoft Repository", Proceedings of the 23rd VLDB Conference, Atens, Greece, 1997, 10 pgs.
"Mueller et al., Penumbra: an Eclipse plugin for introductory programming. In Procedings of the 2003 OOPSLA Workshop on Eclipse Technology Exchange (Anaheim. California, Oct. 27, 2003, 65-68".
Berliner, Cvs II: Parelleizing Software Development, White paper, Prisma, Inc., Colorado Springs, CO, 1990.
U.S. Appl. No. 10/907,423, Office Action, Mar. 26, 2009, 18 pages.
U.S. Appl. No. 10/907,423, Office Action, Oct. 30, 2009, 13 pages.
U.S. Appl. No. 10/907,423, Office Action, Jul. 7, 2010, 9 pages.
U.S. Appl. No. 11/398,057, Notice of Allowance and Fees Due, Dec. 16, 2013, 14 pages.
Dulman, L. "Visual Ada developer", 2002, ACM pg. 30-34.
Green, T. "Verdantium Towards a Java-Enabled Compound Document Model", 2000, ACM, pg. 77-78.
Baker, S., "The Making of Orbix and the iPortal Suite," ICSE2000, Limerick, Ireland, pp. 609-616.
"Chiang, C., "Development of Reusable Components through the Use of Adapters," Proceedings of the 36th Hawaii International Conference on System Sciences, 2003, pp. 1-10.".
"Lunt, P., "Join the Pieces to Build Processes," Jun. 2003, http://www.transformmag.com/db_area/archs/2003/06/tfm0306tr_1.shtml, pp. 1-4.".
U.S. Appl. No. 11/398,057, Office Action, Dec. 29, 2008, 6 pages.
Microsoft Windows XP Explorer (screen dumps, 2001; pp. 3).
U.S. Appl. No. 11/398,057, Office Action, Jun. 11, 2009, 6 pages.
U.S. Appl. No. 11/398,057, Office Action, Oct. 30, 2009, 7 pages.
U.S. Appl. No. 11/398,057, Office Action, May 18, 2010, 7 pages.
U.S. Appl. No. 11/398,057, Examiner's Answer, Dec. 10, 2010, 8 pages.
Chamberland et al., "IBM VisualAge for JAVA," 1998, pp. 386-408, IBM Systems Journal, vol. 37, No. 3.
Pham, Notice of Allowance and Fee(s) Due for U.S. Appl. No. 11/398,057 dated Jan. 30, 2014, 18 pages.

* cited by examiner

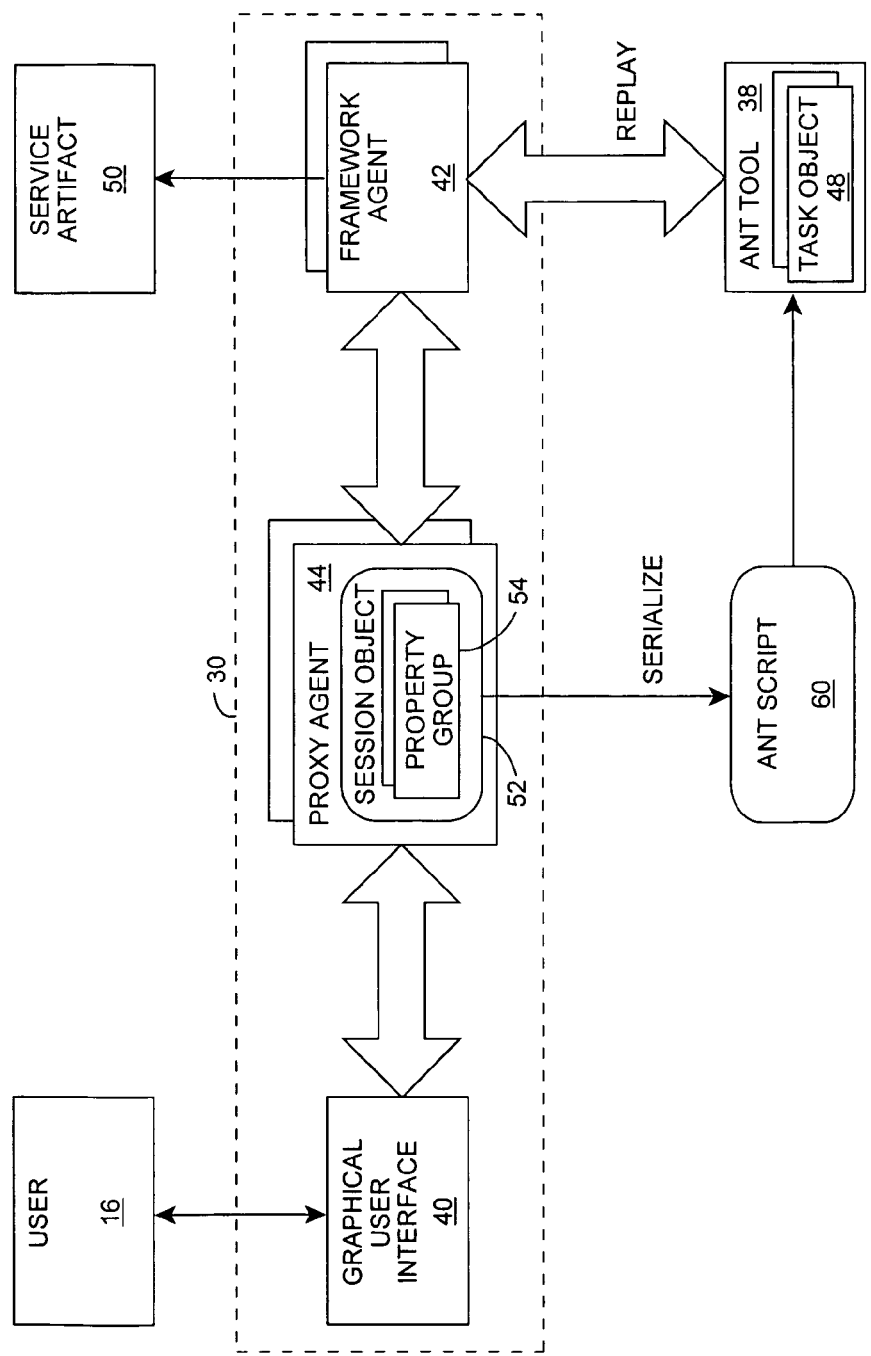

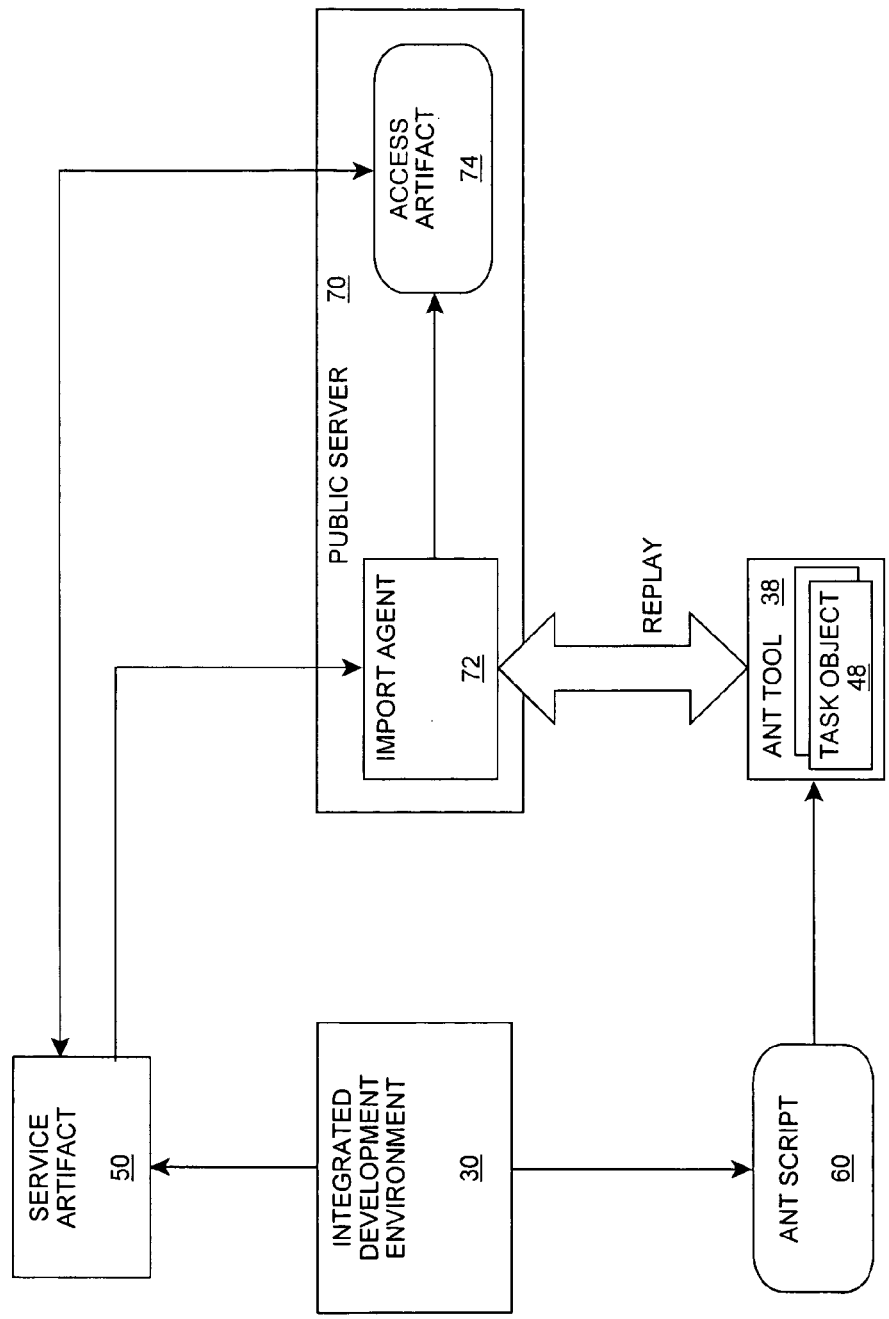

STORING MODIFICATION DATA FOR RECREATING MODIFICATIONS

REFERENCE TO RELATED APPLICATIONS

The current application is related to co-owned and co-pending U.S. patent application Ser. No. 10/907,363, filed on Mar. 30, 2005, and entitled "Common Import and Discovery Framework", co-owned and co-pending U.S. patent application Ser. No. 10/907,423 filed on Mar. 31, 2005, and entitled "Generic User Input for GUI Framework", and co-owned and co-pending U.S. patent application Ser. No. 11/399,232, filed on 6 Apr. 2006, and entitled "Configurable Importers and Resource Writers", each of which is hereby incorporated herein by reference.

FIELD OF THE INVENTION

The invention relates generally to managing a set of artifacts, such as development artifact(s) for a service, and more particularly, to a solution for storing modification data for an artifact and/or recreating a modification using the stored modification data.

BACKGROUND OF THE INVENTION

In an integrated development environment (IDE), a user commonly modifies one or more artifacts. Each artifact can comprise one of a set of artifacts for implementing a functional component. Frequently, it is desirable to recreate the various steps performed by the user in making the modification(s). In one approach, the steps are manually recreated. However, as the series of steps becomes longer, such an approach quickly becomes more difficult and error prone. In an alternative approach, a component is used to record and subsequently play back all the user actions (e.g., mouse clicks, menu selections, and/or the like) with the user interface. However, this approach requires that the IDE launch the user interface to properly recreate each step.

In view of the foregoing, there exists a need in the art to overcome one or more of the deficiencies indicated herein and/or one or more other deficiencies not expressly discussed herein.

BRIEF SUMMARY OF THE INVENTION

The invention provides a solution for managing a set of artifacts in which modification data is captured while an artifact is modified and is stored. A proxy agent is generated for a framework agent that manages a set of modifications for an artifact. The proxy agent receives a modification message from, for example, a graphical user interface, captures modification data based on the modification message and forwards the modification message for processing by the framework agent. The captured modification data is serialized in an extensible markup language (XML)-based document for later processing. In one embodiment, the XML-based document comprises an Ant configuration file (script), which can be executed to recreate the modification(s) with or without generating a user interface.

A first aspect of the invention provides a method of managing a set of artifacts, the method comprising: generating a proxy agent for a framework agent, wherein the framework agent manages a set of modifications for an artifact in the set of artifacts; and with the proxy agent: receiving a modification message for the artifact; capturing modification data based on the modification message; and forwarding the modification message for processing by the framework agent.

A second aspect of the invention provides a system for managing a set of artifacts, the system comprising: a system for generating a proxy agent for a framework agent, wherein the framework agent manages a set of modifications for an artifact in the set of artifacts; and wherein the proxy agent includes: a system for receiving a modification message for the artifact; a system for capturing modification data based on the modification message; a system for forwarding the modification message for processing by the framework agent; and a system for serializing the modification data in an XML-based document.

A third aspect of the invention provides a program product stored on a computer-readable medium, which when executed, enables a computer infrastructure to manage a set of artifacts, the program product comprising computer program code for enabling the computer infrastructure to: generate a proxy agent for a framework agent, wherein the framework agent manages a set of modifications for an artifact in the set of artifacts; and wherein the proxy agent includes computer program code for enabling the computer infrastructure to: receive a modification message for the artifact; capture modification data based on the modification message; forward the modification message for processing by the framework agent; and serialize the modification data in an XML-based document.

A fourth aspect of the invention provides a method of generating a system for managing a set of artifacts, the method comprising: providing a computer infrastructure operable to: generate a proxy agent for a framework agent, wherein the framework agent manages a set of modifications for an artifact in the set of artifacts; and with the proxy agent: receive a modification message for the artifact; capture modification data based on the modification message; forward the modification message for processing by the framework agent; and serialize the modification data in an XML-based document.

A fifth aspect of the invention provides a business method for managing a set of artifacts, the business method comprising managing a computer infrastructure that performs the process described herein; and receiving payment based on the managing.

The illustrative aspects of the present invention are designed to solve one or more of the problems herein described and/or one or more other problems not discussed.

BRIEF DESCRIPTION OF THE SEVERAL VIEWS OF THE DRAWINGS

These and other features of the invention will be more readily understood from the following detailed description of the various aspects of the invention taken in conjunction with the accompanying drawings that depict various embodiments of the invention.

FIG. 2 shows an illustrative data flow diagram for modifying an artifact according to an embodiment of the invention.

FIG. 3 shows an illustrative data flow diagram for exposing a service to a public server according to an embodiment of the invention.

Figure 1:
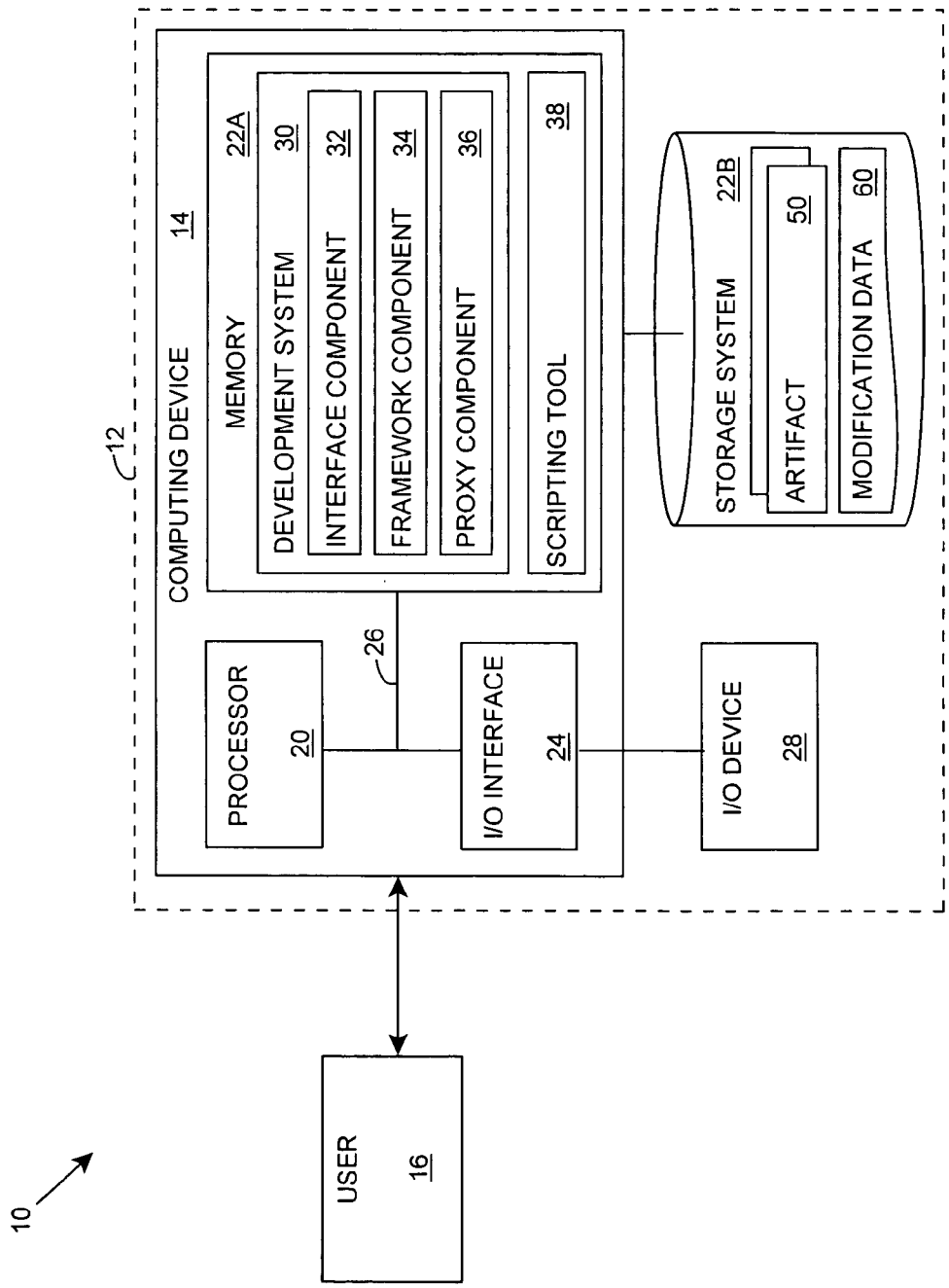
FIG. 1 shows an illustrative environment for managing a set of artifacts according to an embodiment of the invention.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, the invention provides a solution for managing a set of artifacts in which modification data is captured while an artifact is modified and is stored. A proxy agent is generated for a framework agent that manages a set of modifications for an artifact. The proxy agent receives a modification message from, for example, a graphical user interface, captures modification data based on the modification message and forwards the modification message for processing by the framework agent. The captured modification data is serialized in an extensible markup language (XML)-based document for later processing. In one embodiment, the XML-based document comprises an Ant configuration file (script), which can be executed to recreate the modification(s) with or without generating a user interface. As used herein, unless otherwise noted, the term "set" means one or more (i.e., at least one) and the phrase "any solution" means any now known or later developed solution.

Turning to the drawings, FIG. 1 shows an illustrative environment 10 for managing a set of artifacts 50 according to an embodiment of the invention. To this extent, environment 10 includes a computer infrastructure 12 that can perform the process described herein in order to manage artifact(s) 50. In particular, computer infrastructure 12 is shown including a computing device 14 that comprises a development system 30, which makes computing device 14 operable to manage artifact(s) 50 by performing the process described herein. To this extent, development system 30 can capture modification data 60 when one or more artifacts 50 are modified by user 16 and store it for later processing. For example, modification data 60 can be used to recreate the modification(s) of artifact(s) 50.

Computing device 14 is shown including a processor 20, a memory 22A, an input/output (I/O) interface 24, and a bus 26. Further, computing device 14 is shown in communication with an I/O device/resource 28 and a storage system 22B. As is known in the art, in general, processor 20 executes computer program code, such as development system 30, which is stored in memory 22A and/or storage system 22B. While executing computer program code, processor 20 can read and/or write data, such as artifact 50, to/from memory 22A, storage system 22B, and/or I/O interface 24. Bus 26 provides a communications link between each of the components in computing device 14. I/O device 28 can comprise any device that enables an individual to interact with computing device 14 or any device that enables computing device 14 to communicate with one or more other computing devices using any type of communications link.

In any event, computing device 14 can comprise any general purpose computing article of manufacture capable of executing computer program code installed thereon. However, it is understood that computing device 14 and development system 30 are only representative of various possible equivalent computing devices that may perform the process described herein. To this extent, in other embodiments, the functionality provided by computing device 14 and development system 30 can be implemented by a computing article of manufacture that includes any combination of general and/or specific purpose hardware and/or computer program code. In each embodiment, the program code and hardware can be created using standard programming and engineering techniques, respectively.

Similarly, computer infrastructure 12 is only illustrative of various types of computer infrastructures for implementing the invention. For example, in one embodiment, computer infrastructure 12 comprises two or more computing devices that communicate over any type of communications link, such as a network, a shared memory, or the like, to perform the process described herein. Further, while performing the process described herein, one or more computing devices in computer infrastructure 12 can communicate with one or more other computing devices external to computer infrastructure 12 using any type of communications link. In either case, the communications link can comprise any combination of various types of wired and/or wireless links; comprise any combination of one or more types of networks (e.g., the Internet, a wide area network, a local area network, a virtual private network, etc.); and/or utilize any combination of various types of transmission techniques and protocols.

As discussed herein, development system 30 enables computer infrastructure 12 to manage a set of artifacts 50. To this extent, development system 30 is shown including an interface component 32, a framework component 34, and a proxy component 36. Operation of each of these systems is discussed further herein. However, it is understood that some of the various systems shown in FIG. 1 can be implemented independently, combined, and/or stored in memory for one or more separate computing devices that are included in computer infrastructure 12. For example, memory 22A is shown including a scripting tool 38, which is implemented apart from development system 30. However, it is understood that scripting tool 38 could comprise a component of development system 30. Further, it is understood that some of the systems and/or functionality may not be implemented, or additional systems and/or functionality may be included as part of computer infrastructure 12.

Regardless, the invention provides a solution for managing artifact(s) 50. In general, development system 30 enables one or more users 16 to view, modify, delete, and/or the like, one or more artifacts 50. To this extent, development system 30 can read and write data for each artifact 50 to/from storage systems 22A-B using any solution. In one embodiment, data for each artifact 50 is stored as one or more files in a file system, which can define various objects/structures that can be manipulated (e.g., modified, added, deleted, etc.) in a dynamic memory using development system 30 and subsequently stored in the one or more files. However, it is understood that data for artifact(s) 50 can be managed using any solution.

Development system 30 includes an interface component 32 for enabling user 16 to request various operations on artifact(s) 50 using any solution. For example, interface component 32 can generate a user interface for display to user 16, which renders some or all of artifact 50. In this case, the user interface can enable user 16 to generate one or more requests to add/remove an artifact 50 from a set of artifacts 50 (e.g., a project), view a particular artifact 50, modify an artifact 50, and/or the like. Further, interface component 32 can define an application program interface (API) or the like that enables user 16, another system in this case, to provide similar requests.

Framework component 34 can perform one or more operations on the set of artifacts 50 in response to the request. For example, framework component 34 can obtain some or all of the data for artifact(s) 50, make one or more modifications to artifact(s) 50, delete/create artifact(s) 50, and/or the like. In general, interface component 32 will forward a modification message to framework component 34 based on the request. Framework component 34 will perform one or more functions based on the modification message and forward a response back to interface component 32. Interface component 32, then can respond to user 16 accordingly, e.g., by updating a user interface, responding to a request message, and/or the like.

Proxy component 36 can process the modification message(s) communicated between interface component 32 and framework component 34. In particular, proxy component 36 can capture modification data 60 based on one or more modification messages communicated in order to modify artifact(s) 50. Proxy component 36 then can serialize the modification data 60 into one or more data files for storage and/or later playback. To this extent, modification data 60 can be stored as a script file, which can be played/executed by a corresponding scripting tool 38.

FIG. 2 shows an illustrative data flow diagram for modifying an artifact 50 according to an embodiment of the invention. In this embodiment, artifact 50 comprises a service artifact 50. As such, service artifact 50 implements a service within computer infrastructure 12 (FIG. 1). For example, computer infrastructure 12 could comprise an enterprise information system (EIS), and service artifact 50 could implement one or more functions on data stored in EIS. To this extent, service artifact 50 can process requests by users 16 to obtain/view data, modify data, create/delete data, and/or the like. The data can comprise data for any of various types of business-related applications, such as inventory, accounting, product/service offerings, payroll, and/or the like.

In any event, referring to FIGS. 1 and 2, development system 30 can enable user(s) 16 to modify service artifact 50. To this extent, interface component 32 can generate a graphical user interface (GUI) 40 for display to user 16. User 16 can use GUI 40 to generate one or more requests for operations on service artifact 50, which GUI 40 forwards for processing by a framework agent 42 implemented as part of framework component 34. Each framework agent 42 manages a set of modifications to one or more service artifacts 50. To this extent, framework agent 42 can comprise a component that implements a particular function/modification for various types of artifacts 50, a component that implements a set of functions/modifications for a certain type of artifact 50, and/or the like. Upon receiving the request, framework agent 42 can implement the request on service artifact 50 and provide a response for processing by GUI 40 based on the request (e.g., a result of an operation, requested data, and/or the like).

Proxy component 36 can generate a proxy agent 44 for framework agent 42. Proxy agent 44 receives messages (e.g., requests and responses) communicated between GUI 40 and the corresponding framework agent 42. In particular, a message generated by GUI 40 for processing by framework agent 42 is first received by proxy agent 44, which forwards the message for processing by framework agent 42. Similarly, a response generated by framework agent 42 for processing by GUI 40 is first received by proxy agent 44, which forwards the message for processing by GUI 40.

Proxy component 36 can determine when to generate proxy agent 44 for framework agent 42 using any solution. For example, proxy component 36 can always generate a proxy agent 44 for every framework agent 42 and/or generate proxy agent 44 as part of an initialization process for enabling communications between GUI 40 and framework 42. Further, proxy component 36 can identify when a request to view service artifact 50 is generated by GUI 40. Still further, proxy agent 44 can be generated in response to a request to modify service artifact 50, e.g., when user 16 first requests a modification to service artifact 50. Still further, GUI 40 can include an ability for user 16 to select when to begin/stop capturing data for a set of modifications, and proxy component 36 can generate proxy agent 44 in response to a request to begin capturing data.

Regardless, proxy agent 44 can receive a modification message for service artifact 50, which was generated by GUI 40. Proxy agent 44 can capture modification data 60 (FIG. 1) based on the modification message. In one embodiment, framework component 34 comprises an Import Framework as shown and described in the co-pending U.S. patent application Ser. No. 10/907,363, which is hereby incorporated herein by reference, and the modification message comprises an object, such as a configurable Importer or Generator as shown and described in the co-pending U.S. patent application Ser. No. 11/399,232. To this extent, the object can contain the modification data within Properties and Property Groups as shown and described in the co-pending U.S. patent application Ser. No. 10/907,423, which is hereby incorporated herein by reference.

In this case, proxy agent 44 can store the modification data in a session object 52, which includes one or more property groups 54. Session object 52 can be initialized when proxy agent 44 is created, e.g., during an initialization phase for communications between GUI 40 and framework agent 42. Each property group 54 can correspond to a particular modification message and include one or more properties that corresponds to the modification data included in the modification message. Regardless, proxy agent 44 can forward the modification message to framework agent 42 for processing. Proxy agent 44 can receive and process responses from framework agent 42 in a similar manner. To this extent, if necessary, proxy agent 44 can capture and store data in a response in a property group 54.

Proxy agent 44 can serialize session object 52 in one or more data files for more permanent storage and/or later playback. In one embodiment, proxy agent 44 serializes session object 52 upon completion of a set of modifications to service artifact 50. Proxy agent 44 can identify the completion using any solution. For example, proxy agent 44 can receive a request to save one or more modifications performed to service artifact 50, receive a request from GUI 40 to stop capturing data, and/or the like. To this extent, proxy agent 44 can identify an end of a session between GUI 40 and a framework agent 42. Further, proxy agent 44 can serialize modification data for multiple sessions between GUI 40 and one or more framework agents 42 together. Still further, multiple proxy agents 44 could store modification data in a shared session object 52 and/or multiple session objects 52, which are subsequently serialized together to reproduce a set of modifications.

In any event, proxy agent 44 can serialize session object 52 in an extensible markup language (XML)-based document 60. In one embodiment, proxy agent 44 serializes session object 52 in an Apache Ant XML format, which comprises a Java-based build tool defined by the Apache Software Foundation. In this case, XML-based document 60 comprises an Ant configuration file (script) 60, which can be executed by an Ant tool 38. Ant script 60 defines a project, which includes one or more targets. Each target can include a set of tasks, each of which is implemented by a task object 48 (i.e., a Java class). Ant defines a set of default tasks and corresponding task objects 48, which are extendible to any number of tasks.

An illustrative Ant script 60 is shown below:

```
<?xml version="1.0"?>
<project name="com.ibm.adapter.command" default="EIS">
```

-continued

```
<target name="EIS">
    <!-- perform import task -->
    <discoveryAgent
        type="com/ibm/adapter/agent:EisWsifDiscoveryAgent">
        <importResource name="RepositoryLocation"
            value="remote"/>
        <importProperties>
            <propertyElement name="EISSearchParameter"
                value=""/>
        </importProperties>
        <searchParameters>
            <propertyElement
                name="{http://services.myeis.com/}CustomerInfo"/>
            <propertyElement name="getAddress"/>
            <propertyElement name="getCustomer"/>
        </searchParameters>
    </discoveryAgent>
</target>
</project>
```

In this case, Ant script 60 includes one target named "EIS", which will be executed by Ant tool 38 when Ant script 60 is invoked. The target includes one task, discoveryAgent, which includes various property elements, each of which corresponds to modification data provided by user 16 using GUI 40. The task is implemented by a corresponding discoveryAgent task object 48. The discoveryAgent task object 48 will include the same internal logic to implement the messages communicated between GUI 40 and framework agent 42. Ant script 60 can include multiple tasks. In this case, Ant tool 38 can process each task in a pipeline fashion, using the corresponding task object 48. In this manner, by executing Ant script 60, Ant tool 38 can recreate the set of modification messages provided from GUI 40 to framework agent 42.

Ant script 60 can be used to recreate the set of modification messages as part of numerous applications. For example, Ant script 60 can be used to reproduce a series of steps performed by user 16 as part of a testing/debugging phase of development. To this extent, since Ant script 60 can be launched from a command line, multiple sets of modifications, each stored in a separate Ant script 60, can be provided and executed by Ant tool 38 to test/debug one or more modifications to framework agent 42 and/or service artifact 50 without development system 30 being required to generate GUI 40. Further, since Ant script 60 comprises a text file, a user can use any type of editor to display and/or modify Ant script 60. For example, a user may want to modify a file name included in Ant script 60 or the like, prior to executing Ant script 60.

Further, as noted above, service artifact 50 can implement a service on an EIS. Frequently, it is desirable to expose such a service to a public server, such as a web server, an application server, and/or the like. FIG. 3 shows an illustrative data flow diagram for exposing a service to a public server 70 according to an embodiment of the invention. In particular, public server 70 can include an import agent 72 that discovers service artifact 50 to be exposed to public server 70. Import agent 72 can obtain data regarding service artifact 50 and generate an access artifact 74 that enables access to service artifact 50 from public server 70. A user then can interact with service artifact 50 by interacting with access artifact 74 on public server 70.

Subsequently, one or more users may use an integrated development environment (IDE) 30 to make one or more modifications to service artifact 50. When such modification(s) are made, it may be desirable to update access artifact 74 based on the modification(s). As a result, IDE 30 can generate Ant script 60 as described above. Ant tool 38 can be used to recreate the modification(s) for processing by import agent 72. In this manner, import agent 72 can make the necessary modification(s) to access artifact 74. By using Ant script 60, each message communicated while user 16 (FIG. 2) performed the modification(s) using IDE 30 will be reproduced for import agent 72. Similarly, import agent 72 does not need to generate a user interface or the like since Ant script 60 can be executed from the command line. It is understood that Ant script 60 can be used for numerous other applications as will be recognized by one familiar with the art.

While shown and described herein as a method and system for managing a set of artifacts, it is understood that the invention further provides various alternative embodiments. For example, in one embodiment, the invention provides a program product stored on a computer-readable medium, which when executed, enables a computer infrastructure to manage the set of artifacts. To this extent, the computer-readable medium includes program code, such as development system 30 (FIG. 1), which implements the process described herein. It is understood that the term "computer-readable medium" comprises one or more of any type of tangible medium of expression (e.g., physical embodiment) of the program code. In particular, the computer-readable medium can comprise program code embodied on one or more portable storage articles of manufacture (e.g., a compact disc, a magnetic disk, a tape, etc.), on one or more data storage portions of a computing device, such as memory 22A (FIG. 1) and/or storage system 22B (FIG. 1) (e.g., a fixed disk, a read-only memory, a random access memory, a cache memory, etc.), as a data signal traveling over a network (e.g., during a wired/wireless electronic distribution of the program product), on paper (e.g., capable of being scanned and converted to electronic data), and/or the like.

In another embodiment, the invention provides a method of generating a system for managing a set of artifacts. In this case, a computer infrastructure, such as computer infrastructure 12 (FIG. 1), can be obtained (e.g., created, maintained, having made available to, etc.) and one or more systems for performing the process described herein can be obtained (e.g., created, purchased, used, modified, etc.) and deployed to the computer infrastructure. To this extent, the deployment of each system can comprise one or more of: (1) installing program code on a computing device, such as computing device 14 (FIG. 1), from a computer-readable medium; (2) adding one or more computing devices to the computer infrastructure; and (3) incorporating and/or modifying one or more existing systems of the computer infrastructure, to enable the computer infrastructure to perform the process steps of the invention.

In still another embodiment, the invention provides a method that performs the process described herein on a subscription, advertising, and/or fee basis. That is, a service provider, such as an application service provider, could offer to manage the set of artifacts as described herein. In this case, the service provider can manage (e.g., create, maintain, support, etc.) a computer infrastructure, such as computer infrastructure 12 (FIG. 1), that performs the process described herein for one or more customers. In return, the service provider can receive payment from the customer(s) under a subscription and/or fee agreement, receive payment from the sale of advertising to one or more third parties, and/or the like.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation;

(b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that the terms "component" and "system" are synonymous as used herein and represent any combination of hardware and/or software capable of performing some function(s).

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method of managing a set of artifacts, the method comprising:
   generating a proxy agent for a framework agent at a first at least one computing device, wherein the framework agent manages a set of modifications to the data for an artifact in the set of artifacts, wherein the proxy agent receives messages communicated from one of a user interface or the framework agent for processing by the other of the user interface or the framework agent, processes the messages, and forwards the messages to the other of the user interface or the framework agent, and wherein the artifact implements a service in a computer infrastructure;
   receiving a modification message for processing by the framework agent for the artifact from the user interface at the proxy agent executing on the first at least one computing device;
   capturing modification data based on the modification message using the proxy agent, wherein the modification data is distinct from the modification message;
   storing the modification data using the proxy agent, wherein the stored modification data is configured to recreate the modification message without the user interface when executed by a computing device; and
   forwarding the modification message from the proxy agent for processing by the framework agent executing on a second at least one computing device.

2. The method of claim 1, further comprising generating the user interface for enabling a user to request a modification to the artifact.

3. The method of claim 1, the storing including serializing the modification data in an XML-based document.

4. The method of claim 3, further comprising identifying a completion of a set of modifications to the artifact, wherein the serializing is performed in response to the completion.

5. The method of claim 3, wherein the XML-based document comprises an Ant script.

6. The method of claim 5, further comprising recreating the modification message by executing the Ant script using an Ant tool.

7. The method of claim 3, the method further comprising modifying an access artifact on a public server using the XML-based document, the access artifact enabling access to the service from the public server.

8. The method of claim 1, further comprising:
   generating an access artifact at a public server based on the artifact prior to the receiving;
   obtaining the stored modification data on the public server; and
   executing the stored modification data to update the access artifact.

9. A system for managing a set of artifacts, the system comprising:
   a set of computing devices including:
   a processor;
   a memory;
   a system for generating a proxy agent for a framework agent, wherein the framework agent manages a set of modifications to the data for an artifact in the set of artifacts, wherein the proxy agent receives messages communicated from one of a user interface or the framework agent for processing by the other of the user interface or the framework agent, processes the messages, and forwards the messages to the other of the user interface or the framework agent, and wherein the artifact implements a service in a computer infrastructure; and
   wherein the proxy agent includes:
      a system for receiving a modification message for processing by the framework agent for the artifact from the user interface;
      a system for capturing modification data based on the modification message, wherein the modification data is distinct from the modification message;
      a system for forwarding the modification message for processing by the framework agent; and
      a system for serializing the modification data in an XML-based document, wherein the serialized modification data is configured to recreate the modification message without the user interface when executed by a computing device.

10. The system of claim 9, the set of computing devices further including a system for generating a user interface for enabling a user to request a modification to the artifact.

11. The system of claim 9, the set of computing devices further including a system for identifying a completion of a set of modifications to the artifact, wherein the modification data is serialized in response to the completion.

12. The system of claim 9, wherein the XML-based document comprises an Ant script, the system further comprising an Ant tool for recreating the modification message by executing the Ant script.

13. The system of claim 12, the set of computing devices further including an extended task object for implementing a task included in the Ant script.

14. The system of claim 9, wherein the artifact implements a service, the system further comprising a system for modifying an access artifact on a public server using the XML-based document, the access artifact enabling access to the service from the public server.

15. A program product stored on a computer-readable electronic storage memory, which when executed, enables a computer infrastructure to manage a set of artifacts, the program product comprising computer program code for enabling the computer infrastructure to:
   generate a proxy agent for a framework agent, wherein the framework agent manages a set of modifications to the data for an artifact in the set of artifacts, wherein the proxy agent receives messages communicated from one of a user interface or the framework agent for processing by the other of the user interface or the framework agent, processes the messages, and forwards the messages to the other of the user interface or the framework agent, and wherein the artifact implements a service in a computer infrastructure; and wherein the proxy agent includes computer program code for enabling the computer infrastructure to:
  receive a modification message for processing by the framework agent for the artifact from the user interface;
  capture modification data based on the modification message, wherein the modification data is distinct from the modification message;
  forward the modification message for processing by the framework agent; and
  serialize the modification data in an XML-based document, wherein the serialized modification data is configured to recreate the modification message without the user interface when executed by a computing device.

16. The program product of claim 15, further comprising computer program code for enabling the computer infrastructure to generate a user interface for enabling a user to request a modification to the artifact.

17. The program product of claim 15, wherein the XML-based document comprises an Ant script, the program product further comprising an Ant tool for enabling the computer infrastructure to recreate the modification message by executing the Ant script.

18. The program product of claim 17, further comprising an extended task object for enabling the computer infrastructure to implement a task included in the Ant script.

19. The program product of claim 15, wherein the artifact implements a service, the program product further comprising computer program code for enabling the computer infrastructure to modify an access artifact on a public server using the XML-based document, the access artifact enabling access to the service from the public server.

20. A method of generating a system for managing a set of artifacts, the method comprising:
  providing a computer infrastructure operable to:
    generate a proxy agent for a framework agent, wherein the framework agent manages a set of modifications to the data for an artifact in the set of artifacts, wherein the proxy agent receives messages communicated from one of a user interface or the framework agent for processing by the other of the user interface or the framework agent, processes the messages, and forwards the messages to the other of the user interface or the framework agent, and wherein the artifact implements a service in a computer infrastructure;
    receive a modification message for processing by the framework agent for the artifact from the user interface at the proxy agent;
    capture modification data based on the modification message using the proxy agent, wherein the modification data is distinct from the modification message;
    forward the modification message from the proxy agent for processing by the framework agent; and
    serialize the modification data in an XML-based document, wherein the serialized modification data is configured to recreate the modification message without the user interface when executed by a computing device.

* * * * *